(12) United States Patent
Tan et al.

(10) Patent No.: US 12,184,009 B1
(45) Date of Patent: Dec. 31, 2024

(54) STACKED LARGE-CAPACITY SIGNAL ACQUISITION AND TRANSMISSION SYSTEM AND DESIGN METHOD THEREOF

(71) Applicant: North University of China, Taiyuan (CN)

(72) Inventors: Qiulin Tan, Taiyuan (CN); Helei Dong, Taiyuan (CN); Junqi Pang, Taiyuan (CN); Hua Ren, Taiyuan (CN); Lei Zhang, Taiyuan (CN); Wenyi Liu, Taiyuan (CN); Jijun Xiong, Taiyuan (CN)

(73) Assignee: NORTH UNIVERSITY OF CHINA, Taiyuan (CN)

( * ) Notice: Subject to any disclaimer, the term of this patent is extended or adjusted under 35 U.S.C. 154(b) by 0 days.

(21) Appl. No.: 18/755,145

(22) Filed: Jun. 26, 2024

(30) Foreign Application Priority Data

Jun. 30, 2023 (CN) .......................... 202310790407.8

(51) Int. Cl.
| | |
|---|---|
| H01R 31/06 | (2006.01) |
| H01R 13/646 | (2011.01) |
| H01R 31/00 | (2006.01) |
| H04B 1/00 | (2006.01) |

(52) U.S. Cl.
CPC ......... *H01R 13/646* (2013.01); *H01R 31/005* (2013.01); *H01R 31/065* (2013.01); *H04B 1/0067* (2013.01)

(58) Field of Classification Search
None
See application file for complete search history.

(56) References Cited

U.S. PATENT DOCUMENTS 9,119,533 B2  9/2015  Ghaffari

FOREIGN PATENT DOCUMENTS

| CN | 105992564 A | 10/2016 |
|---|---|---|
| CN | 210119810 U | 2/2020 |
| CN | 210488282 U | 5/2020 |

(Continued)

OTHER PUBLICATIONS

Liu Jianing, et al, "Design of Cascaded Multi-channel Signal Isolated Acquisition Circuit," Instrument Technology and Sensors, Date of issue: Dec. 15, 2016, pp. 148-151, 180 No. 12. (abstract translated, Related claims: 1-10).

(Continued)

*Primary Examiner* — Curtis A Kuntz
*Assistant Examiner* — Jerold B Murphy
(74) *Attorney, Agent, or Firm* — Pilloff Passino & Cosenza LLP; Rachel Pilloff; Sean Passino

(57) ABSTRACT

The application belongs to the technical field of signal acquisition, and discloses a stacked large-capacity signal acquisition and transmission system, which includes an adapter board, n acquisition boards, central control boards and a communication board sequentially laminated; where a circuit structure of each of the acquisition boards is the same; the adapter board is provided with circuit board interfaces and a plurality of first board-level connectors; an m-th acquisition board is provided with a signal acquisition and conditioning module, at least n−m+1 second board-level connectors and at least m third board-level connectors; the central control board is provided with a signal conversion module, at least one fourth board-level connector and at least one fifth board-level connector.

10 Claims, 8 Drawing Sheets

(56) References Cited

FOREIGN PATENT DOCUMENTS

CN  112104366 A  12/2020
CN  115856801 A  3/2023

OTHER PUBLICATIONS

Chu Chengjun, et al., "The Design of Multi-channel Signal Data Acquisition Circuit Based on FPGA," Science Technology and Engineering, Date of issue: Jul. 8, 2013. p. 5692-5701, 13, No. 19. (abstract on last page, Related claims: 1-10).
Junqi Pang, et al, "Optimization Design and Application of Positioning Search Technology Based on Satellite Navigation System," 2022 IEEE 22nd International Conference on Communication Technology, Date of issue: Dec. 31, 2022, pp. 468-473 (Related claims: 1-10).
Notification to Grant Patent for China Application No. 202310790407.8, mailed Aug. 2, 2023.
First search report for China Application No. 202310790407.8, dated Aug. 4, 2023.

STACKED LARGE-CAPACITY SIGNAL ACQUISITION AND TRANSMISSION SYSTEM AND DESIGN METHOD THEREOF

CROSS-REFERENCE TO RELATED APPLICATIONS

This application claims priority to Chinese Patent Application No. 202310790407.8, filed on Jun. 30, 2023, the contents of which are hereby incorporated by reference.

TECHNICAL FIELD

The application belongs to the technical field of sensor signal acquisition, transmission and control, and in particular to a stacked large-capacity signal acquisition and transmission system and a design method thereof, which may be applied to synchronous acquisition and transmission of large-capacity signals in harsh environments.

BACKGROUND

In the modern information society with high-speed information flow, the high-speed data transmission used in information systems in various fields has become the standard to measure the system performance. The information transmission has developed from a serial interface to a parallel interface, and the information transmission bandwidth has been continuously expanded. However, for a large-capacity signal acquisition system, the multi-channel acquisition signal leads are many, the crosstalk is serious, the transmission structure is complex, and the system architecture design is difficult in a specific environment and installation size. The existing large-capacity signal acquisition and transmission are based on static mode, but for high-speed rotating environment, dynamic balance design is of great significance to the safety of equipment and the stability of signal transmission. Therefore, it is necessary to provide a signal acquisition and transmission system that is capable of being applied to high-speed rotating environment.

SUMMARY

The application overcomes the shortcomings of the prior art, and the technical problem to be solved is to provide a stacked large-capacity signal acquisition and transmission system and a design method thereof, so as to realize the acquisition of large-capacity data signals under the rotating condition, reduce the difficulty of circuit design, and improve the balance performance and transmission efficiency of the circuit.

In order to solve the above technical problems, the technical scheme adopted by the application is as follows: a stacked large-capacity signal acquisition and transmission system, including an adapter board, n acquisition boards, central control boards and a communication board sequentially laminated; where a circuit structure of each of the acquisition boards is the same;

the adapter board is provided with circuit board interfaces and n first board-level connectors; in the adapter board, the circuit board interfaces are used for connecting external signal input interfaces, and the circuit board interfaces are connected with each of the first board-level connectors;

an m-th acquisition board is provided with a signal acquisition and conditioning module, at least n−m+1 second board-level connectors and at least m third board-level connectors; in the acquisition boards, an input end and an output end of the signal acquisition and conditioning module are respectively connected with one of the second board-level connectors and the third board-level connectors; where m and n are integer numbers, and $1 \leq m \leq n$;

each central control board is provided with a signal conversion module, at least one fourth board-level connector and at least one fifth board-level connector; an input end and an output end of the signal conversion module are respectively connected with the fourth board-level connector and the fifth board-level connector;

the communication board is provided with a communication module and sixth board-level connectors; the communication board is used for communicating with an upper computer;

a connection between the adapter board and a first acquisition board is realized by splicing the first board-level connectors and the second board-level connectors; a connection of each of the acquisition boards is realized by splicing the second board-level connectors and the third board-level connectors respectively; a connection between a last acquisition board and the central control board through a splicing of the third board-level connectors and the fourth board-level connectors; a connection between the central control board and the communication board is realized by a splicing of the fifth board-level connectors and the sixth board-level connectors;

and when each of the acquisition boards is connected, the second board-level connectors and the third board-level connectors respectively connected with the input end and the output end of the signal acquisition and conditioning module are located at different projection positions.

The first board-level connectors, the second board-level connectors, the third board-level connectors, the fourth board-level connectors and the fifth board-level connectors are ESQT series board connectors.

In the first acquisition board, each of the second board-level connectors is uniformly distributed on a periphery of the acquisition board, and in the last acquisition board, each of the third board-level connectors is uniformly distributed on the periphery of the acquisition board.

The third board-level connectors are arranged outside the second board-level connectors, and on a same acquisition board, the third board-level connectors connected with the output end of the signal acquisition and conditioning module is arranged at a farthest end of the second board-level connectors connected with the output end of the signal acquisition and conditioning module.

The acquisition boards are four in number.

A plurality of central control boards are included, and on each of the central control boards, the fourth board-level connectors connected with the input end of the signal conversion module sequentially pass through a corresponding fourth board-level connector on a previous level central control board and is connected with a corresponding third board-level connector; the fifth board-level connectors connected with the output end of the signal acquisition and conditioning module sequentially pass through a corresponding fifth board-level connector on a next level central control board and is connected with the communication board.

In two adjacent central control boards, signals are transmitted in mutually perpendicular directions.

The communication board is also provided with a power module, and an output end of each sixth board-level connector is connected with the communication module, and the power module is used for supplying power.

In addition, the application also provides a design method of the stacked large-capacity signal acquisition and transmission system, including following steps:

S1, determining a size of a system, a maximum number of sampling channels and a sampling rate;

S2, determining a number of sampling channels of each of the acquisition boards, and determining a number of acquisition boards according to the number of sampling channels and the maximum number of sampling channels of each of the acquisition boards;

S3, according to the number of the acquisition boards, determining numbers and arrangement positions of the second board-level connectors and the third board-level connectors in each of the acquisition boards; and S4, carrying out a circuit design on the acquisition boards according to the arrangement positions of the second board-level connectors and the third board-level connectors, and simultaneously carrying out a circuit design on the central control board according to an arrangement mode of the third board-level connectors.

The S2 further includes following steps: determining a number of the central control boards according to a number of sampling channels and a maximum number of sampling channels of the central control board;

the S3 further includes following steps: determining a number and arrangement positions of the fifth board-level connectors in the central control boards according to the number of the central control boards, and determining a number and arrangement positions of the fourth board-level connectors according to the arrangement positions of the third board-level connectors; and in the S4, carrying out a circuit design on the central control boards according to numbers and arrangement positions of the fourth board-level connectors and the fifth board-level connectors.

Compared with the prior art, the application has the following beneficial effects.

The application provides a low-impedance, stacked, axisymmetric and physically isolated stacked large-capacity signal acquisition and transmission system and a design method thereof. By arranging the circuit into a plurality of PCB circuit boards, namely an adapter board, acquisition boards, central control boards and a communication board, each PCB circuit board is stacked in a laminated mode in turn, and by arranging board-level connectors on each PCB circuit board, signals are sequentially transmitted and processed from top to bottom, so that signal crosstalk may be avoided, and the signal bearing capacity of the system is improved. Taking 32 channels of signals acquired by each acquisition board as an example, 128 channels of large-capacity data may be acquired by four acquisition boards. Moreover, the circuit is easy to expand, symmetrical in circuit structure, stable and reliable, good in compatibility and strong in anti-interference, and may be applied to high-speed rotating environment. The application may be used for the expansion of large-capacity signal acquisition and transmission.

DETAILED DESCRIPTION OF THE EMBODIMENTS

In order to make the objectives, technical scheme and advantages of the embodiments of the present application more clear, the technical schemes in the embodiments of the present application will be described clearly and completely below. Obviously, the described embodiments constitutes a part of the embodiments of the present application, but not the whole embodiments; based on the embodiments in the present application, all other embodiments obtained by ordinary technicians in the field before making creative work belong to the scope of protection of the present application.

Embodiment 1

Figure 1:
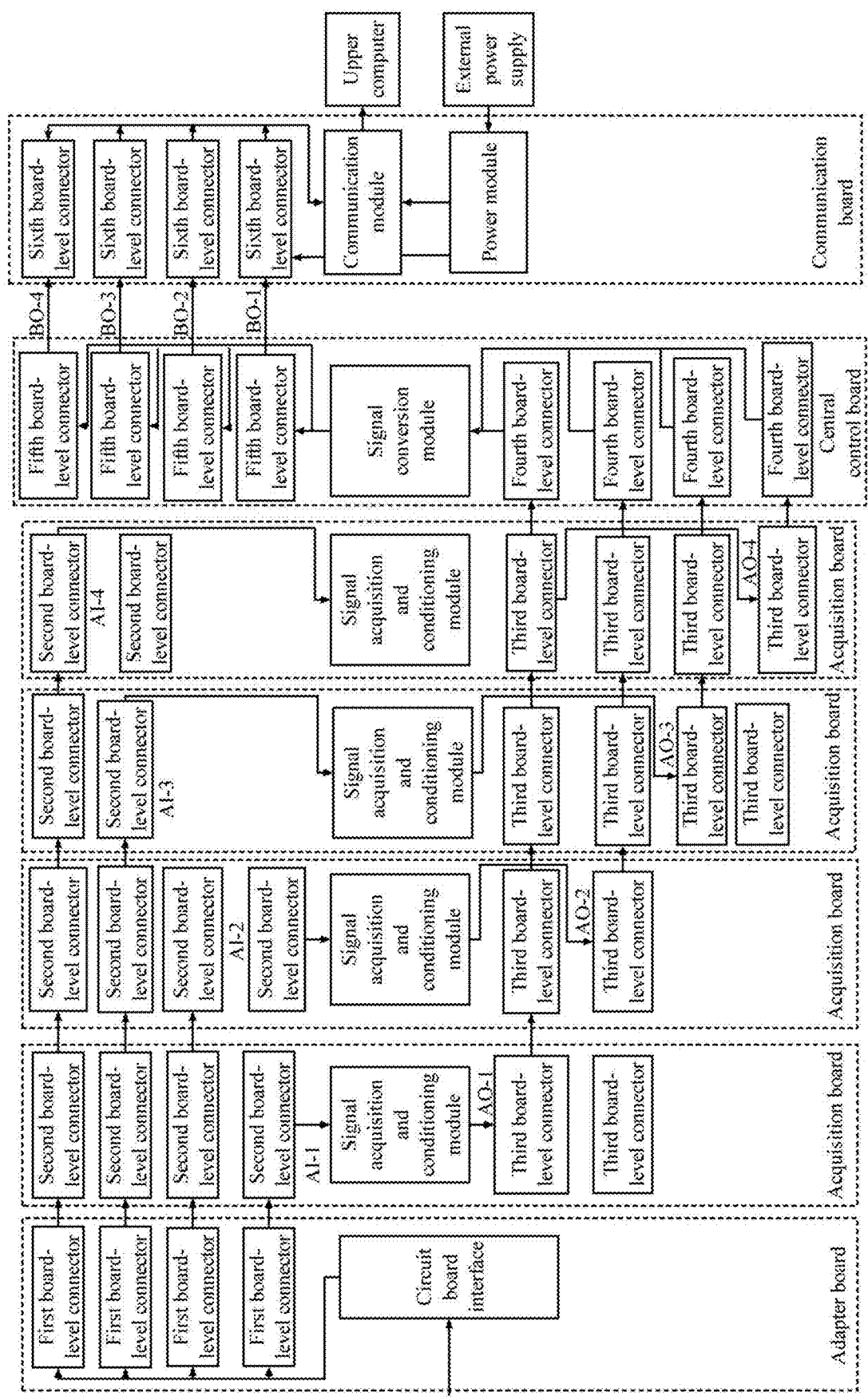
FIG. 1 is a schematic circuit diagram of the stacked large-capacity signal acquisition and transmission system provided by Embodiment 1 of the present application.
Figure 2:
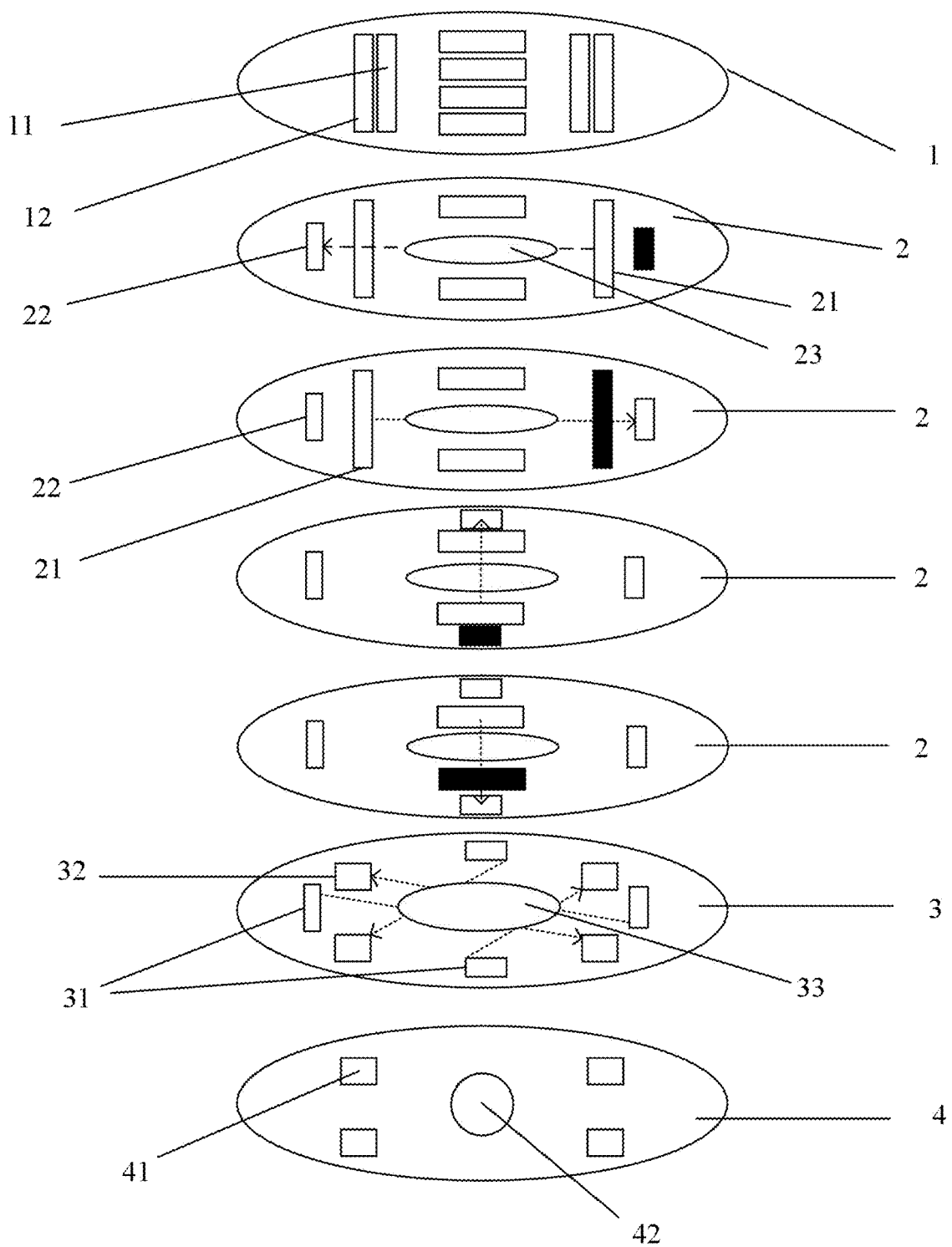
FIG. 2 is a schematic structural diagram of Embodiment 1 of the present application.

As shown in FIG. 1 and FIG. 2, Embodiment 1 of the present application provides a stacked large-capacity signal acquisition and transmission system, including: an adapter board 1, four acquisition boards 2, central control boards 3 and a communication board 4 sequentially laminated; where the adapter board 1, the four acquisition boards 2, the central control boards 3 and the communication board 4 are all circuit boards, and the circuit structure of each of the acquisition boards 2 is the same.

The adapter board 1 is provided with four circuit board interfaces 11 and four first board-level connectors 12; in the adapter board 1, the circuit board interfaces 11 are used for connecting external signal input interfaces, and the circuit board interfaces 11 are connected with each of the first board-level connectors 12; the acquisition board 2 is provided with a signal acquisition and conditioning module 23, at least one second board-level connector 21 and at least one third board-level connector 22; in the acquisition board 2, an input end of the signal acquisition and conditioning module 23 is connected with one of the second board-level connectors 21, and an output end of the signal acquisition and conditioning module 23 is connected with one of the third board-level connectors 22; the central control board 3 is provided with a signal conversion module 33, four fourth board-level connectors 31 and four fifth board-level connectors 32. In each central control board, the input end and output end of the signal conversion module 33 are respectively connected with one of the fourth board-level connectors 31 and the fifth board-level connectors 32. The communication board 4 is provided with a communication module and sixth board-level connectors 41; the communication board 4 is used to communicate with an upper computer, and at the same time receives external power supply and converts the external power supply into a secondary power supply required by other boards, and transmits the power signal downwards through the sixth board-level connectors 41. The fourth board-level connectors 31 and the second board-level connectors 21 also contain the received power signals.

A connection between the adapter board 1 and a first acquisition board 2 is realized by splicing the first board-level connectors 12 and the second board-level connectors 21; a connection of each of the acquisition boards 2 is realized by splicing the second board-level connectors 21 and the third board-level connectors 22 respectively; a connection between a last acquisition board 2 and the central control board 3 through a splicing of the third board-level connectors 22 and the fourth board-level connectors 31; a connection between the central control board 3 and the communication board 4 is realized by a splicing of the fifth board-level connectors 32 and the sixth board-level connectors 41.

In each acquisition board 2, the second board-level connector 21 and the third board-level connector 22, which are respectively connected with the input end and the output end of the signal acquisition and conditioning module 23, are located at different projection positions. The above arrangement mode of the acquisition board 2 makes the signals input by the second board-level connectors 21 on the first acquisition board 2 to be acquired through the signal acquisition and conditioning module on one of the acquisition boards 2. In this embodiment, on each acquisition board 2, the second board-level connector 21 connected with the input end of the signal acquisition and conditioning module 23 is connected with the corresponding first board-level connector 12 through the corresponding second board-level connector 21 on the previous level acquisition board 2, and the third board-level connector 22 connected with the output end of the signal acquisition and conditioning module 23 is connected with the corresponding fourth board-level connector 31 on the central control board 3 through the corresponding third board-level connector 22 on the next level acquisition board 2.

Specifically, in this embodiment, the first acquisition board 2 is provided with four second board-level connectors 21, two third board-level connectors 22, and the four second board-level connectors 21 are used for receiving four sets of sensing signals transmitted from the adapter board, where one set of 32 channels sensing signals is received by one of the second board-level connectors 21, and is subjected to isolation, filtering, amplification and other processing by the signal acquisition and conditioning module 23 on the first acquisition board 2, and is transmitted to the next acquisition board 2 through the corresponding third board-level connector 22, and transmitted to the fourth board-level connector 31 on the central control board 3 through the third board-level connectors 22 on the second, third and fourth acquisition boards 2 in turn. The other three sets of sensing signals are directly transmitted to the next acquisition board 2 through the other three second board-level connectors 21. The second acquisition board 2 is provided with four second board-level connectors 21 and two third board-level connectors 22, of which three second board-level connectors 21 are used to receive three sets of signals that have not been processed by the signal acquisition and conditioning module 23, and the other second board-level connector 21 is used to balance the counterweight to realize dynamic balance in rotating state. One set of the signals is subjected to isolation, filtering, amplification and other processing by the signal acquisition and conditioning module 23 on the first acquisition board 2, and is transmitted to the next acquisition board 2 through the corresponding third board-level connector 22, and transmitted to the fourth board-level connector 31 on the central control board 3 through the third board-level connectors 22 on the third and fourth acquisition boards 2 in turn. The remaining two sets of unprocessed signals are transmitted to the next acquisition board 2 through the other second board-level connectors 21, and by analogy, when reaching the fourth acquisition board 2, all the four sets of signals are transmitted to four fourth board-level connectors 31 on the central control board 3 through four third board-level connectors 22. The fifth board-level connectors 32 on the central control board 3 are connected with the communication board 4, and after the signal conversion is performed on the four sets of signals transmitted to the central control board 3 by the signal conversion module 33, then the collected conversion data is packaged and sent to the communication board 4, and then sent to the receiving terminal for parsing through the communication module 42 of the communication board 4. The communication board 4 is provided with a communication module and a power module.

The signal acquisition and conditioning module 23 is used to isolate, filter and amplify the corresponding signals, the signal conversion module 33 is used to perform AD conversion on the signals of each channel, and the communication module is used to communicate and forward the signals acquired by each channel. The communication board 4 is used to realize the digital communication of the acquisition system through wired\wireless mode. The wireless communication mode may be radio frequency, Bluetooth, 4G\5G or space optical communication, and the wired communication mode may be LVDS, USB, 1000Base-T or optical fiber communication. In addition, the communication board 4 is also used to supply power to the central control board 3, and the external power supply mode for the communication board 4 may be wireless power supply or wired power supply. Wired power supply provides corresponding power supply according to the system power supply requirements, and wireless power supply includes electromagnetic power supply, space light power supply and so on. The communication board 4 is provided with a communication module 42 for wired power supply and communication.

Specifically, in this embodiment, the first board-level connectors 11, the second board-level connectors 21, the third board-level connectors 22, the fourth board-level connectors 31 and the fifth board-level connectors 32 are ESQT series board connectors. In this embodiment, the signal input and output of each board-level connector are all 32 channels, and board connectors with pins of 25*3 rows and 2.0 mm spacing are selected as the signal input, and board connectors with 16*3 rows and 2.0 mm spacing are selected as the signal output.

Specifically, in this embodiment, in the first acquisition board 2, the second board-level connectors 21 are evenly distributed on the periphery of the acquisition board 2, and in the last acquisition board 2, the third board-level connectors 22 are evenly distributed on the periphery of the acquisition board 2. The circuit layout in each acquisition board 2 is the same, and the installation positions of the reserved second board-level connectors 21 and third board-level connectors 22 are also the same. The difference is that some second board-level connectors 21 and/or third board-level connectors 22 in each acquisition board 2 are vacant, and the number of second board-level connectors 21 connected to the circuit in the previous level acquisition board 2 is greater than that in the next level, and the number of third board-level connectors 22 connected to the circuit in the previous level acquisition board 2 is less than that in the next level.

Preferably, in order to keep the axial symmetry and dynamic balance in rotating state of the circuit, the second board-level connectors 21 and the third board-level connectors 22 on the acquisition board 2 are board-level mounting connectors, which may be arranged in even numbers and symmetrically installed, and the reserved second board-level connectors 21 and the third board-level connectors 22 are not connected to the circuit, as shown in the shaded part in FIG. 2. When assembling the circuit, it is only necessary to rotate the angle of the second acquisition board 2 by 180° relative to the first acquisition board 2. The angle of the third acquisition board 2 is rotated 90° relative to that of the second acquisition board 2. The angle of the fourth acquisition board 2 is rotated 180° relative to that of the third acquisition board 2. There is no need to design the circuit of each acquisition board 2 separately.

In addition, in this embodiment, the structures of each acquisition board 2 may be completely the same, including four second board-level connectors 21 and four third board-level connectors 22 uniformly distributed on the acquisition board 2, and only one second board-level connector 21 and one third board-level connector 22 are connected with the input end and output end of the corresponding signal acquisition and conditioning module 23, and the relative angles of each adjacent acquisition board 2 are 90° during installation. The above arrangement may further realize the dynamic balance in rotating state of the circuit board.

Specifically, as shown in FIG. 1, in this embodiment, the third board-level connectors 22 are arranged outside the second board-level connectors 21, and on the same acquisition board 2, the third board-level connector 22 connected with the output end of the signal acquisition and conditioning module 23 is arranged at the opposite end of the second board-level connector 21 connected with the output end of the signal acquisition and conditioning module 23, and the second board-level connector 21 for input and third board-level connector 22 for output of the same channel of signals on the acquisition board 2 are distributed on both sides of the signal acquisition and conditioning module 23. Specifically, in this embodiment, in two adjacent acquisition boards 2, the signals are transmitted in mutually perpendicular directions, which may ensure the symmetry and balance of signals.

Figure 3:
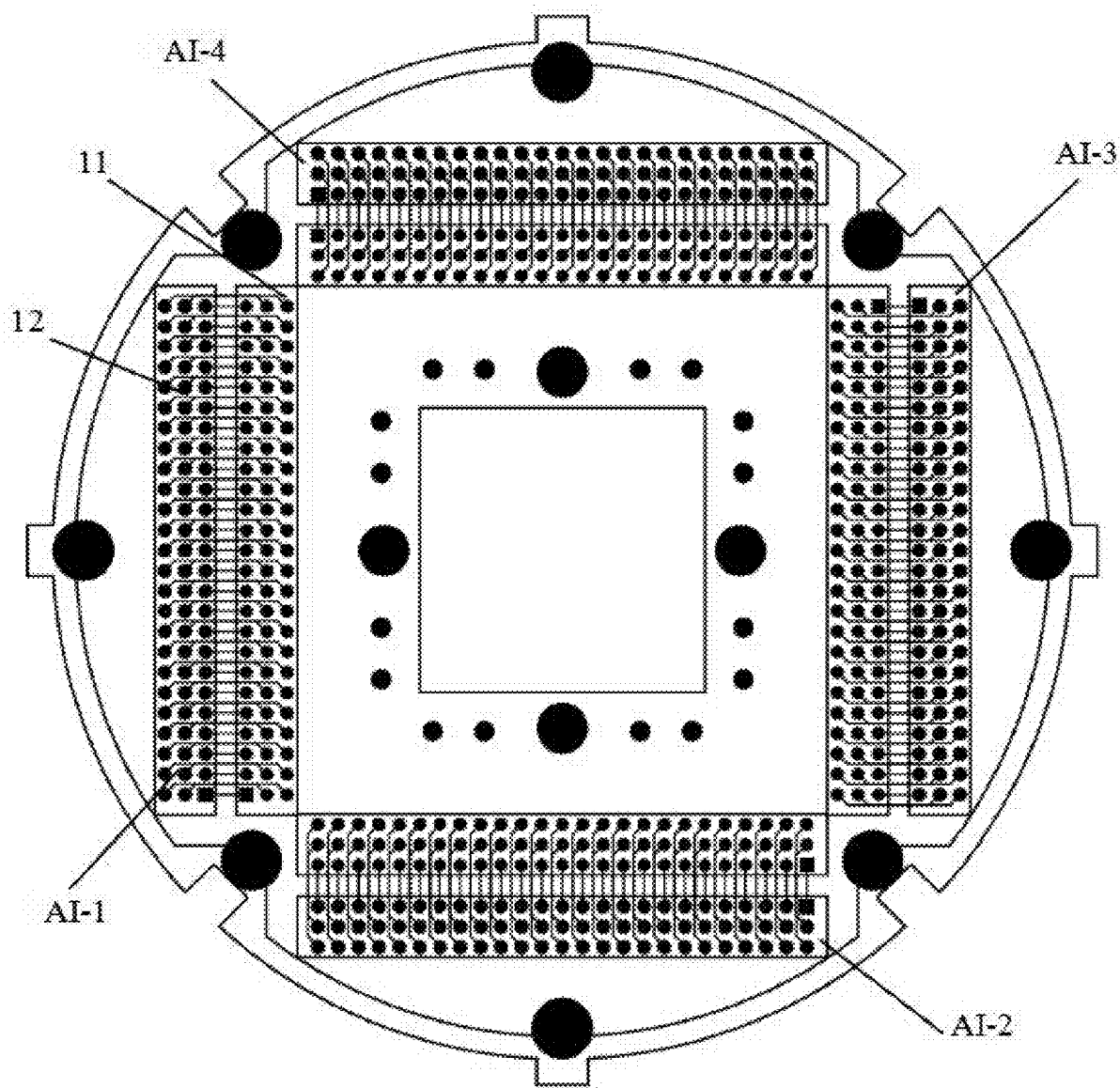
FIG. 3 is a schematic diagram of the circuit design of the adapter board in the Embodiment 1 of the present application.
Figure 4:
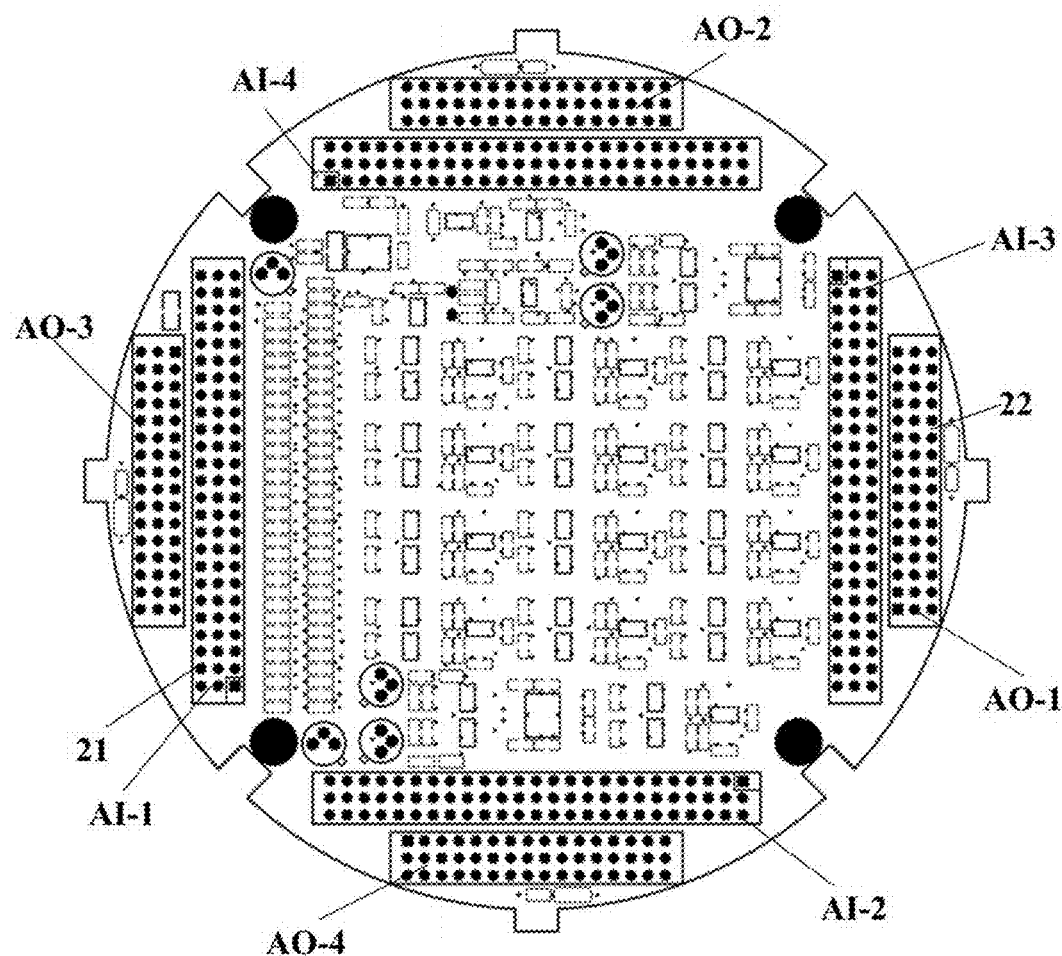
FIG. 4 is a schematic circuit design diagram of the acquisition boards 2 in the Embodiment 1 of the present application.
Figure 5:
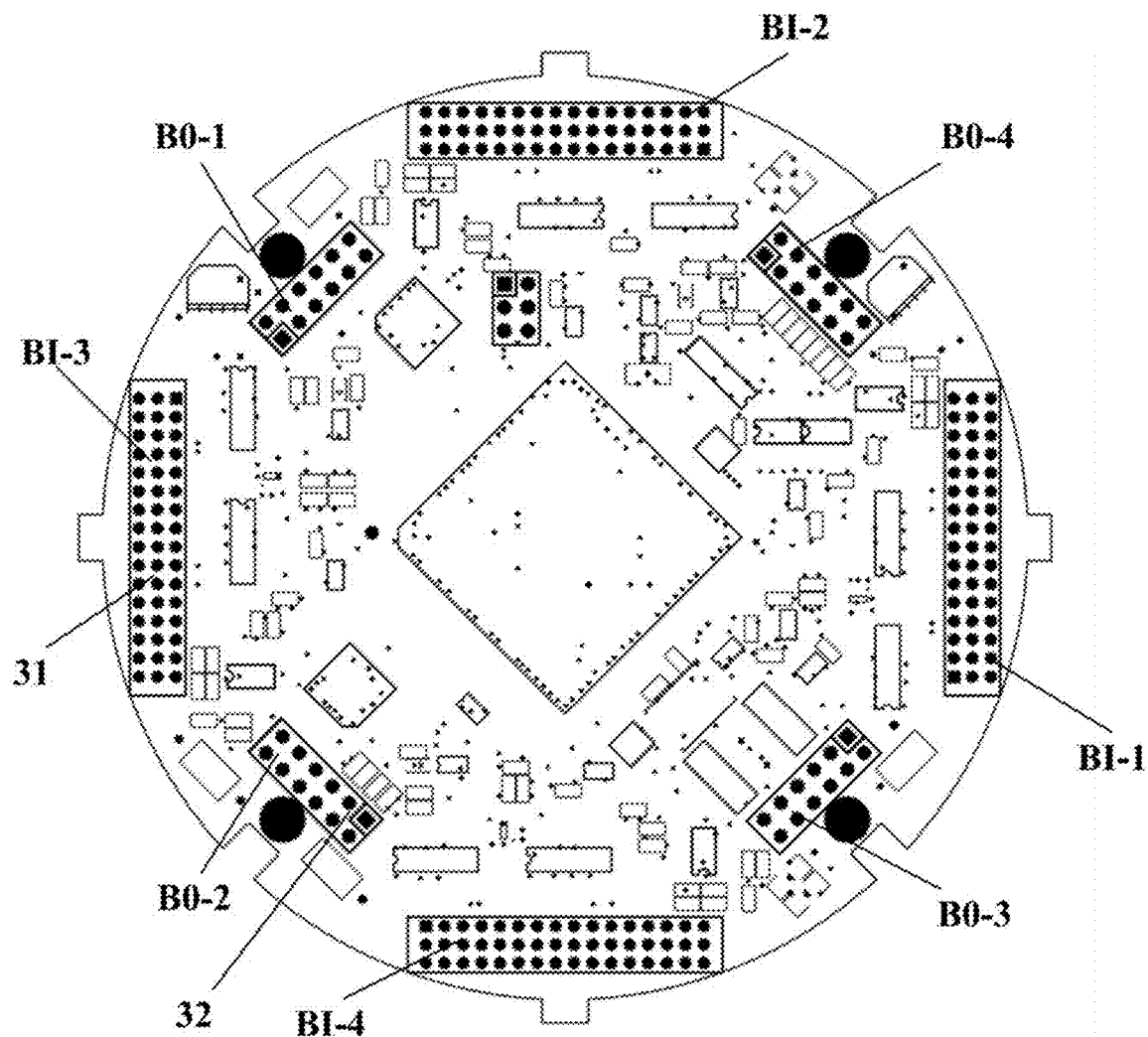
FIG. 5 is a schematic circuit design diagram of the central control board in the Embodiment 1 of the present application.

As shown in FIG. 3, FIG. 4 and FIG. 5, in this embodiment, four first board-level connectors 12 on the adapter board 1 are arranged outside the corresponding circuit board interfaces 11, so four sets of signals AI-1-AI-4 enter the adapter board 1 through the circuit board interfaces 11, and then are input to the second board-level connectors 21 on the acquisition board 2 through the first board-level connectors 12, and then become signals AO-1-AO-4 after being processed by each acquisition board 2, and output from each third board-level connector 22 on the last acquisition board 2. Signals AO-1-AO-4 enter the central control board 3 through the fourth board-level connectors 31 on the central control board 3, and are recorded as signals BI-1-BI-4. These signals are converted into signals BO-1-BO-4 through the signal conversion module 33 on the central control board 3, and are output to the communication board 4 through the fourth board-level connectors 31 on the central control board 3.

Specifically, in this embodiment, the number of acquisition boards 2 may be five or more, and at this time, it is only necessary to increase the number of second board-level connectors 21 and third board-level connectors 22. Assuming that the number of acquisition boards 2 is n, the m-th acquisition board 2 is provided with at least n−m+1 second board-level connectors 21 and at least m third board-level connectors 22; where m and n are integer numbers, and 1≤m≤n.

Specifically, in this embodiment, the communication board 4 is provided with a power module and sixth board-level connectors 41 for connecting with the fifth board-level connectors 32 on the central control board 3. The output end of the sixth board-level connector 41 is connected with the communication module and the power module, and the power module is used for supplying power to the central control board 3. On the one hand, the connection of the fifth board-level connectors 32 and the sixth board-level connectors 41 realizes two-way communication between the signal acquisition and conditioning module 23 and the communication module, and on the other hand, the connection of the fifth board-level connectors 32 and the sixth board-level connectors 41 may supply power to the signal acquisition and conditioning module 23.

Embodiment 2

Figure 6:
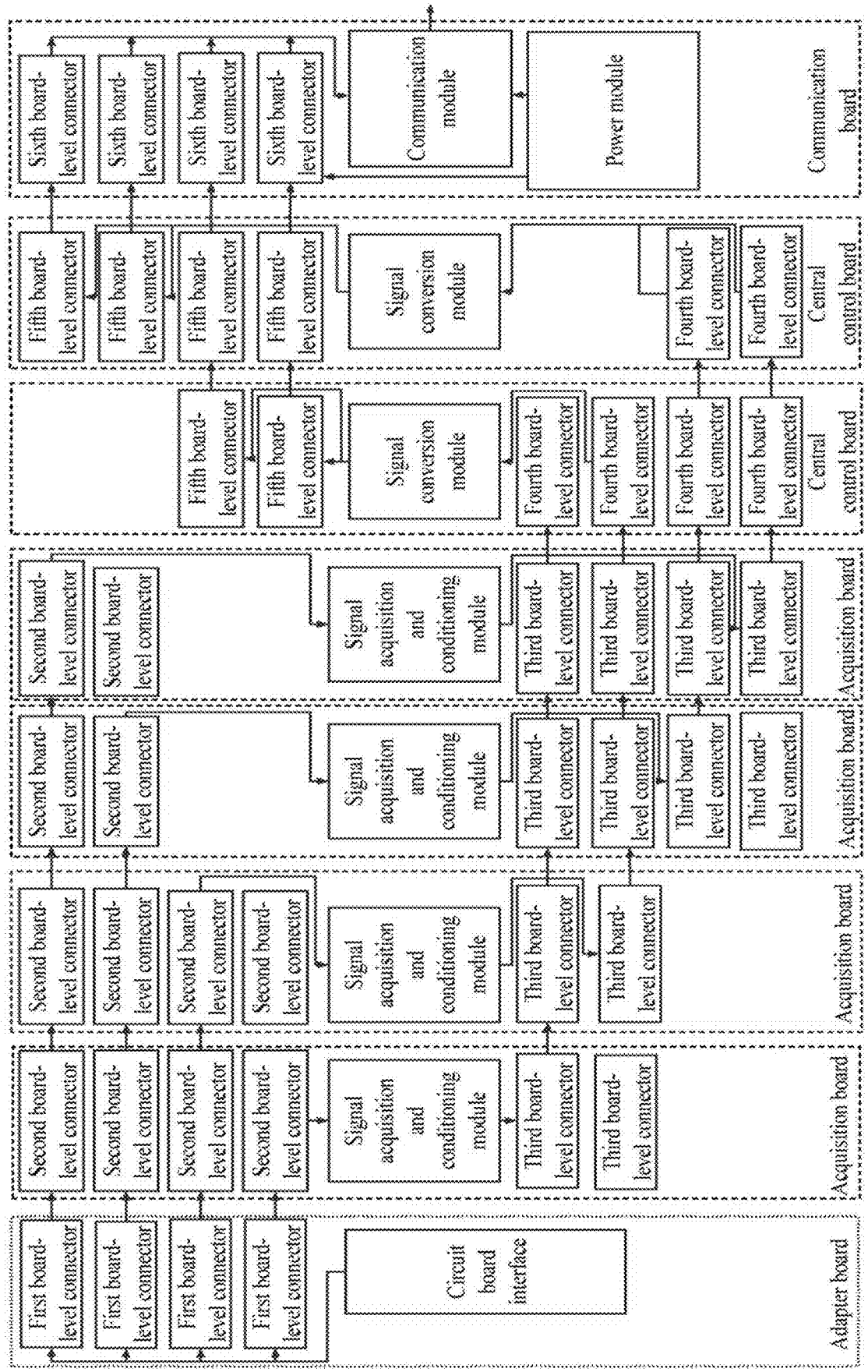
FIG. 6 is a schematic circuit diagram of the stacked large-capacity signal acquisition and transmission system provided by the Embodiment 2 of the present application.

As shown in FIG. 5 and FIG. 6, Embodiment 2 of the present application provides a stacked large-capacity signal acquisition and transmission system, which includes: an adapter board 1, 4 acquisition boards 2, central control boards 3 and a communication board 4 sequentially laminated; where a circuit structure of each of the acquisition boards 2 is the same.

Different from the Embodiment 1, there are two central control boards 3 in this embodiment. Similar to the acquisition board 2, the two central control boards 3 realize the AD conversion of signals by stacked cascading. Specifically, the first central control board 3 is provided with four fourth board-level connectors 31 and two fifth board-level connectors 32, and the second central control board 3 is provided with two fourth board-level connectors 31 and four fifth board-level connectors 32. Four fourth board-level connectors 31 in the first central control board 3 receive four sets of signals of BI-1-BI-4, and BI-1-BI-2 are converted into BO-1-BO-2, and the other two sets of signals of BI-3-BI-4 are sent to the next central control board for conversion into BO-3-BO-4, and then pass through four fifth board-level connectors of the next central control board. For example, each central control board 3 may process 64 channels of signals, in the embodiment of the present application, by setting two central control boards 3, the AD conversion of acquired data of 128 channels may be realized.

Figure 7:
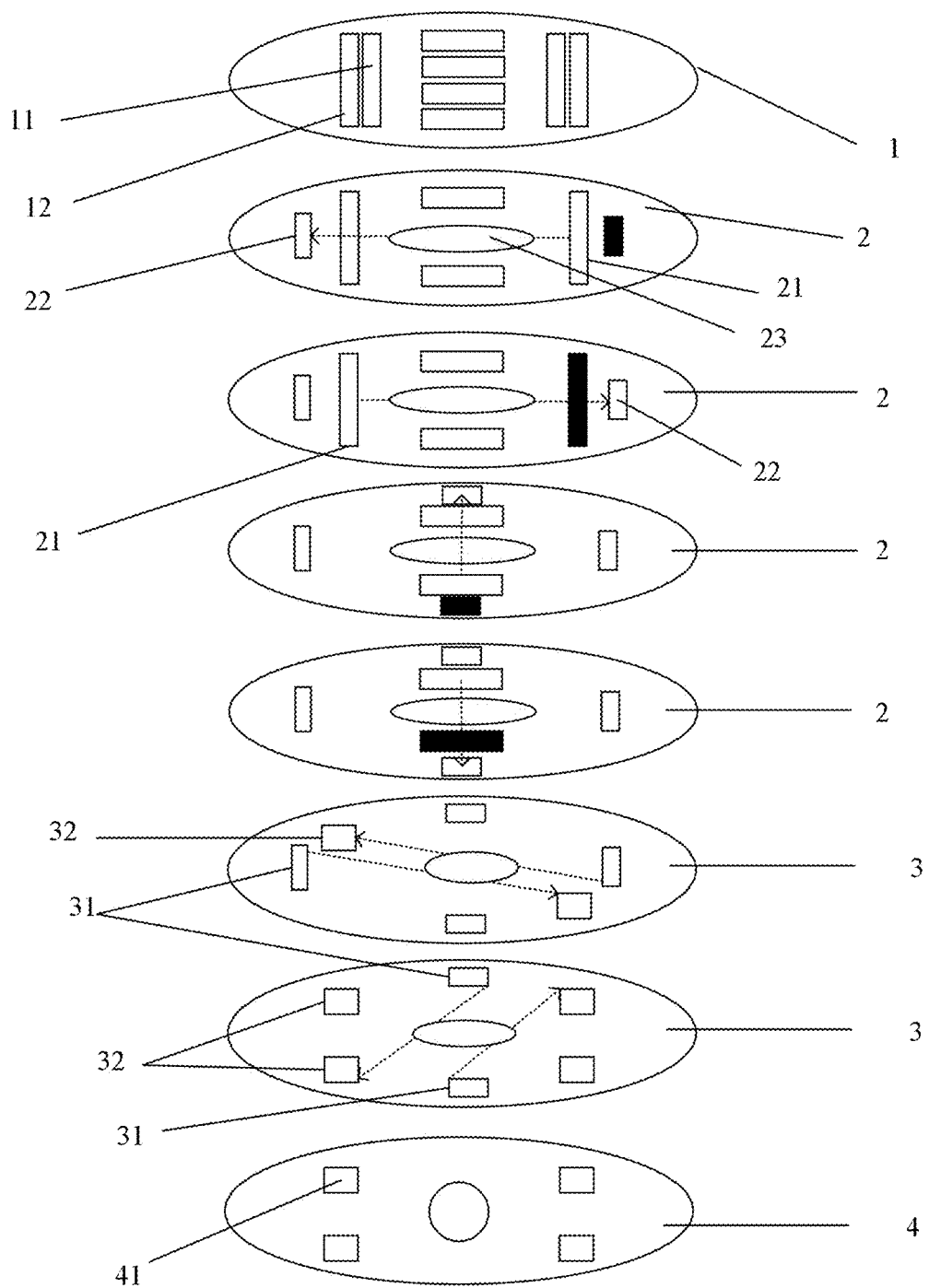
FIG. 7 is a schematic structural diagram of Embodiment 2 of the present application.

Preferably, in this embodiment, as shown in FIG. 7, in two adjacent central control boards 3, the signal transmission directions are perpendicular to each other.

Further, in this embodiment, there may be three or more central control boards 3, and the number of central control boards may be determined according to the total number of channels to be acquired and the number of channels that each central control board may process. Similar to the stacked cascading of the acquisition boards 2, the fourth board-level connectors 31 connected to the input end of the signal conversion module 33 on each central control board 3 are connected to the corresponding third board-level connectors 22 through the corresponding fourth board-level connectors 31 on the previous level central control board 3, and the fifth board-level connectors 32 connected to the output end of the signal acquisition and conditioning module 23 is connected to the communication board 4 through the corresponding fifth board-level connectors 32 on the lower level central control board 3.

Figure 8:
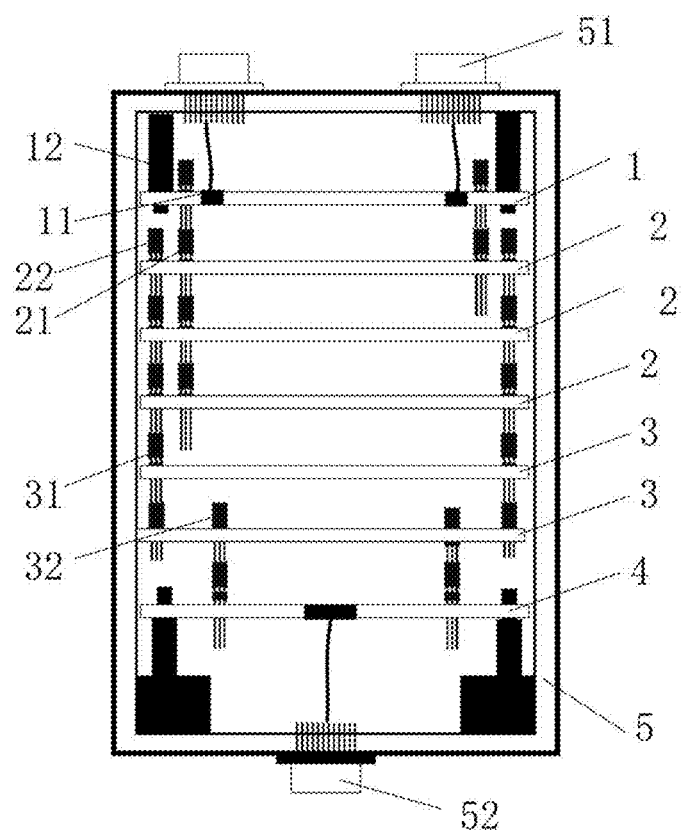
FIG. 8 is a sectional view of the stacked large-capacity signal acquisition and transmission system provided by the Embodiment 2 of the present application.

Further, as shown in FIG. 8, this embodiment may further include a housing 5, in which the adapter board 1, the plurality of acquisition boards 2, the central control boards 3 and the communication board 4 are all arranged, and a signal access terminal 51 is arranged on one side of the housing close to the adapter board 1, and a signal output terminal 52 is arranged on one end close to the communication board. The housing 5 may be cylindrical, and each circuit board is also cylindrical.

Embodiment 3

Embodiment 3 of the present application provides a design method of the stacked large-capacity signal acquisition and transmission system, including the following steps:
S1, determining a size of a system, a maximum number of sampling channels and a sampling rate;
S2, determining a number of sampling channels of each of the acquisition boards 2, and determining a number of acquisition boards 2 according to the number of sampling channels and the maximum number of sampling channels of each of the acquisition boards 2;
S3, according to the number of the acquisition boards 2, determining numbers and arrangement positions of the second board-level connectors 21 and the third board-level connectors 22 in each of the acquisition boards 2; and
S4, carrying out a circuit design on the acquisition boards 2 according to the arrangement positions of the second board-level connectors 21 and the third board-level connectors 22, and simultaneously carrying out a circuit design on the central control board according to an arrangement mode of the third board-level connectors 22.

Specifically, in this embodiment, the S2 further includes following steps: determining a number of the central control boards 3 according to a number of sampling channels and a maximum number of sampling channels of the central control board 3.

The S3 further includes following steps: determining a number and arrangement positions of the fifth board-level connectors 32 in the central control boards 3 according to the number of the central control boards 3, and determining a number and arrangement positions of the fourth board-level connectors 31 according to the arrangement positions of the third board-level connectors 22.

In the S4, carrying out a circuit design on the central control boards 3 according to the numbers and the arrangement positions of the fourth board-level connectors 31 and the fifth board-level connectors 32.

Finally, it should be explained that the above embodiments are only used to illustrate the technical scheme of the application, but not to limit it; although the present application has been described in detail with reference to the foregoing embodiments, it should be understood by those skilled in the art that the technical scheme described in the foregoing embodiments may be modified or some or all of its technical features may be replaced by equivalents. However, these modifications or substitutions do not make the essence of the corresponding technical solutions deviate from the scope of the technical solutions of various embodiments of the present application.

What is claimed is:

1. A stacked large-capacity signal acquisition and transmission system, comprising an adapter board, n acquisition boards, central control boards and a communication board sequentially laminated; wherein component layout of each of the acquisition boards is the same;
the adapter board is provided with circuit board interfaces and n first board-level connectors; in the adapter board, the circuit board interfaces are used for connecting external signal input interfaces, and the circuit board interfaces are connected with each of the first board-level connectors;
an m-th acquisition board is provided with a signal acquisition and conditioning module, at least n−m+1 second board-level connectors and at least m third board-level connectors; in the acquisition boards, an input end and an output end of the signal acquisition and conditioning module are respectively connected with one of the second board-level connectors and the third board-level connectors; wherein m and n are integer numbers, and 1≤m≤n;
each central control board is provided with a signal conversion module, at least one fourth board-level connector and at least one fifth board-level connector; an input end and an output end of the signal conversion module are respectively connected with the fourth board-level connector and the fifth board-level connector;
the communication board is provided with a communication module and sixth board-level connectors; the communication board is used for communicating with an upper computer;
a connection between the adapter board and a first acquisition board is realized by splicing the first board-level connectors and the second board-level connectors; a connection of each of the acquisition boards is realized by splicing the second board-level connectors and the third board-level connectors respectively; a connection between a last acquisition board and the central control board through a splicing of the third board-level connectors and the fourth board-level connectors; a connection between the central control board and the communication board is realized by a splicing of the fifth board-level connectors and the sixth board-level connectors;
and when each of the acquisition boards is connected, the second board-level connectors and the third board-level connectors respectively connected with the input end and the output end of the signal acquisition and conditioning module are located at different projection positions.

2. The stacked large-capacity signal acquisition and transmission system according to claim 1, wherein the first board-level connectors, the second board-level connectors, the third board-level connectors, the fourth board-level connectors and the fifth board-level connectors are ESQT series board connectors.

3. The stacked large-capacity signal acquisition and transmission system according to claim 1, wherein in the first acquisition board, each of the second board-level connectors is uniformly distributed on a periphery of the acquisition board, and in the last acquisition board, each of the third board-level connectors is uniformly distributed on the periphery of the acquisition board.

4. The stacked large-capacity signal acquisition and transmission system according to claim 1, wherein the third board-level connectors are arranged outside the second board-level connectors, and on a same acquisition board, the third board-level connectors connected with the output end of the signal acquisition and conditioning module is arranged at a farthest end of the second board-level connectors connected with the output end of the signal acquisition and conditioning module.

5. The stacked large-capacity signal acquisition and transmission system according to claim 1, wherein the acquisition boards are four in number.

6. The stacked large-capacity signal acquisition and transmission system according to claim 1, wherein a plurality of central control boards are comprised, and on each of the central control boards, the fourth board-level connectors connected with the input end of the signal conversion module sequentially pass through a corresponding fourth board-level connector on a previous level central control board and is connected with a corresponding third board-level connector; the fifth board-level connectors connected with the output end of the signal acquisition and conditioning module sequentially pass through a corresponding fifth board-level connector on a next level central control board and is connected with the communication board.

7. The stacked large-capacity signal acquisition and transmission system according to claim 6, wherein in two adjacent central control boards, signals are transmitted in mutually perpendicular directions.

8. The stacked large-capacity signal acquisition and transmission system according to claim 1, wherein the communication board is also provided with a power module, and an output end of each sixth board-level connector is connected with the communication module, and the power module is used for supplying power.

9. A design method of the stacked large-capacity signal acquisition and transmission system according to claim 1, comprising following steps:

S1, determining a size of a system, a maximum number of sampling channels and a sampling rate;

S2, determining a number of sampling channels of each of the acquisition boards, and determining a number of acquisition boards according to the number of sampling channels and the maximum number of sampling channels of each of the acquisition boards;

S3, according to the number of the acquisition boards, determining numbers and arrangement positions of the second board-level connectors and the third board-level connectors in each of the acquisition boards; and S4, carrying out a circuit design on the acquisition boards according to the arrangement positions of the second board-level connectors and the third board-level connectors, and simultaneously carrying out a circuit design on the central control board according to an arrangement mode of the third board-level connectors.

10. The design method of the stacked large-capacity signal acquisition and transmission system according to claim 9, wherein the S2 further comprises following steps: determining a number of the central control boards according to a number of sampling channels and a maximum number of sampling channels of the central control board;

the S3 further comprises following steps: determining a number and arrangement positions of the fifth board-level connectors in the central control boards according to the number of the central control boards, and determining a number and arrangement positions of the fourth board-level connectors according to the arrangement positions of the third board-level connectors; and in the S4, carrying out a circuit design on the central control boards according to the numbers and the arrangement positions of the fourth board-level connectors and the fifth board-level connectors.

* * * * *